US009552233B1

United States Patent
Tsirkin et al.

(10) Patent No.: US 9,552,233 B1
(45) Date of Patent: Jan. 24, 2017

(54) VIRTUAL MACHINE MIGRATION USING FREE PAGE HINTING

(71) Applicant: Red Hat Israel, Ltd., Ra'anana (IL)

(72) Inventors: Michael Tsirkin, Ra'anana (IL); David Gilbert, Watertown, NY (US)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 14/850,055

(22) Filed: Sep. 10, 2015

(51) Int. Cl.
   G06F 9/455 (2006.01)
   G06F 9/50 (2006.01)

(52) U.S. Cl.
   CPC ......... *G06F 9/5088* (2013.01); *G06F 9/45558* (2013.01); *G06F 9/5016* (2013.01); *G06F 9/5027* (2013.01); *G06F 2009/4557* (2013.01)

(58) Field of Classification Search
   CPC ................. G06F 9/45533; G06F 11/1456
   USPC .............................. 711/162; 718/1
   See application file for complete search history.

(56) References Cited

U.S. PATENT DOCUMENTS

| | | | |
|---|---|---|---|
| 8,356,149 B2 * | 1/2013 | Young | G06F 9/5016 711/162 |
| 8,370,560 B2 | 2/2013 | Dow et al. | |
| 8,386,731 B2 * | 2/2013 | Mashtizadeh | G06F 3/0617 707/639 |
| 8,429,651 B2 | 4/2013 | Donnellan et al. | |
| 9,032,398 B2 * | 5/2015 | Ahmad | G06F 12/08 711/105 |
| 9,058,199 B2 | 6/2015 | Tsirkin | |
| 2013/0031292 A1 | 1/2013 | Van Riel | |
| 2013/0031293 A1 | 1/2013 | Van Riel | |
| 2014/0052892 A1 | 2/2014 | Klein et al. | |
| 2015/0169239 A1 | 6/2015 | Sakai | |

FOREIGN PATENT DOCUMENTS

CN    103365704 A    10/2013

OTHER PUBLICATIONS

Kevin Lawton, "Boosting Server Utilization 100% by Accelerated VM Migration (MemoryMotion™)," Apr. 23, 2009, 3 pages; retrieved from http://www.trendcaller.com/2009/04/boosting-server-utilization-from-60-to.html on Sep. 4, 2015.

(Continued)

*Primary Examiner* — Andy Ho
(74) *Attorney, Agent, or Firm* — Haynes and Boone, LLP (57) ABSTRACT

Systems and methods are disclosed for migrating a virtual machine from a source hypervisor to a destination hypervisor. An example method of migrating a virtual machine from a source hypervisor to a destination hypervisor includes receiving, by a source hypervisor running a virtual machine, an indication to migrate the virtual machine to a destination hypervisor. A guest runs on the virtual machine and is allocated guest memory. The method also includes reading, by the source hypervisor, a free value indicating whether a memory page in the guest memory is active. The method further includes transmitting the memory page to the destination hypervisor if the free value indicates that the memory page is active. The method also includes determining to not transmit the memory page to the destination hypervisor if the free value indicates that the memory page is inactive.

20 Claims, 5 Drawing Sheets

(56) References Cited

OTHER PUBLICATIONS

Sahil Suneja, Elliott Baron, Eyal De Lara, Ryan Johnson; "Accelerating the Cloud with Heterogeneous Computing", 5 pages; University of Toronto; retrieved from https://www.usenix.org/legacy/event/hotcloud11/tech/final_files/Suneja.pdf on Sep. 4, 2015.

Jui-Hao Chiang; "Optimization Techniques for Memory Virtualization-based Resource Management" Dec. 2012; 152 pages; Stony Brook University; retrieved from http://www.ecsl.cs.sunysb.edu/tr/TR253_thesis.pdf on Sep. 4, 2015.

Rik Van Riel; "KVM Performance Optimizations Internals," May 5, 2011, 25 pages; J Boss World Summit; retrieved from http://surriel.com/system/files/riel_t_1620_kvm_performance.pdf on Sep. 4, 2015.

"Live Migration," last modified Sep. 1, 2015, 4 pages; Wikipedia, the free encyclopedia; retrieved from http://en.wikipedia.org/wiki/Live_migration on Sep. 4, 2015.

Reference 1; 11 pages, retrieved from http://people.redhat.com/ruyang/kvm/ on Dec. 20, 2015.

Reference 2; 7 pages, retrieved from http://people.redhat.com/ruyang/kvm/ on Dec. 20, 2015.

Reference 3; 7 pages, retrieved from http://people.redhat.com/ruyang/kvm/ on Dec. 20, 2015.

Reference 4; 21 pages, retrieved from http://people.redhat.com/ruyang/kvm/ on Dec. 20, 2015.

Reference 5; 16 pages, retrieved from http://people.redhat.com/ruyang/kvm/ on Dec. 20, 2015.

Reference 6; "KVM." Translated to English on Jan. 13, 2016; 3 pages retrieved from https://www.goldenlight-publishing.com/catalog/details/store/gb/book/978-3-639-73922-0/%E4%BD%BF%E7%94%A8%E8%99%9A%E6%8B%9F%E8%AE%BE%E5%A4%87%E8%BF%9B%E8%A1%8C%E8%99%9A%E6%8B%9F%E6%9C%BA%E8%BF%81%E7%A7%BB%E7%9A%84%E8%AE%BE%E8%AE%A1%E4%B8%8E%E5%AE%9E%E7%8E%B0 (Link is in Chinese).

Rik Van Riel; "KVM Performance Optimization Internals," May 5, 2011, 25 pages; J Boss World Summit; retrieved from http://surriel.com/system/files/riel_t_1620_kvm_performance.pdf on Sep. 4, 2015.

\* cited by examiner

VIRTUAL MACHINE MIGRATION USING FREE PAGE HINTING

FIELD OF DISCLOSURE

The present disclosure generally relates to virtualization, and more particularly to using free page hinting in relation to virtual machine migration.

BACKGROUND

A virtual machine (VM) is a portion of software that, when executed on appropriate hardware, creates an environment allowing the virtualization of an actual physical computer system. Each VM may function as a self-contained platform, running its own operating system (OS) and software applications (processes). A host machine (e.g., computer or server) is typically enabled to simultaneously run one or more VMs, where each VM may be used by a local or remote client. The host machine allocates a certain amount of the host's resources to each of the VMs. Each VM may use the allocated resources to execute applications, including OSs known as guests or guest OSs. The hypervisor virtualizes the underlying hardware of the host machine or emulates hardware devices, making the use of the VM transparent to the guest OS or the remote client that uses the VM. Typically, a hypervisor manages allocation and virtualization of computer resources and performs context switching, as may be necessary, to cycle between various VMs.

In a virtual environment, a VM running on a host machine may be migrated. Various considerations may be taken into account before the VM is migrated. For example, migrating a large VM may take a long time. As new technologies make VMs with terabytes of memory possible, and as network speeds and CPU cache sizes are growing more slowly, migration times may increase due to the need to move all VM memory across the network or even just read it on the hypervisor (e.g., to compress for faster transmission across the network).

BRIEF SUMMARY

This disclosure relates to migration of a virtual machine from a source hypervisor to a destination hypervisor. Methods, systems, and techniques for migration of a virtual machine using free page hinting are provided.

According to an embodiment, a method of migrating a virtual machine from a source hypervisor to a destination hypervisor includes receiving, by a source hypervisor running a virtual machine, an indication to migrate the virtual machine to a destination hypervisor. A guest runs on the virtual machine and is allocated guest memory. The method also includes reading, by the source hypervisor, a free value indicating whether a memory page in the guest memory is active. The free value is updated by the guest. The method further includes transmitting the memory page to the destination hypervisor if the free value indicates that the memory page is active. The method also includes determining to not transmit the memory page to the destination hypervisor if the free value indicates that the memory page is inactive.

According to another embodiment, a system for migrating a virtual machine from a source hypervisor to a destination hypervisor includes a source hypervisor that runs a virtual machine and receives an indication to migrate the virtual machine to a destination hypervisor. A guest runs on the virtual machine and is allocated guest memory. The system also includes a dirty memory manager that reads a free value indicating whether a memory page in guest memory is active. The free value is updated by the guest. The system further includes a migration module that transmits the memory page to the destination hypervisor if the free value indicates that the memory page is active and determines to not transmit the memory page to the destination hypervisor if the free value indicates that the memory page is inactive.

According to another embodiment, a non-transitory machine-readable medium includes a plurality of machine-readable instructions that when executed by one or more processors are adapted to cause the one or more processors to perform a method including: receiving, by a source hypervisor running a virtual machine, an indication to migrate the virtual machine to a destination hypervisor, where a guest runs on the virtual machine and is allocated guest memory; reading, by the source hypervisor, a free value indicating whether a memory page in the guest memory is active, where the free value is updated by the guest; transmitting the memory page to the destination hypervisor if the free value indicates that the memory page is active; and determining to not transmit the memory page to the destination hypervisor if the free value indicates that the memory page is inactive.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architecture
  A. Page Tables
  B. Source Hypervisor Maintains a Dirty Bitmap
  C. Guest Maintains a Free Bitmap
III. Virtual Machine Migration from Source Hypervisor to Destination Hypervisor
  A. Indication to Migrate Virtual Machine
  B. Hints Provided by Guest C. Source Hypervisor Transmits or Skips Memory Pages Based on Free Values in Free Bitmap
D. Live Virtual Machine Migration
E. Allocate Memory at the Destination Hypervisor
IV. Example Methods
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A virtual machine (VM) running on a source host machine may be migrated to a destination host machine. A source host machine may refer to a host machine running a VM. A destination host machine may refer to the host machine to which the VM running on the source host machine migrates. A plurality of VMs may run on the same host machine, and one or more VMs running on the source host machine may be migrated to the destination host machine. A VM running on a host machine may be migrated to another host machine or a logical partition within the same host machine.

The present disclosure provides techniques to speed up the migration of VMs. The migration of a VM from a source hypervisor to a destination hypervisor typically includes transmitting the memory pages in guest memory that is allocated to a guest running on the VM to the destination hypervisor. It may be desirable to reduce the amount of memory pages in guest memory allocated at the source host machine that is moved between hypervisors to reduce migration time. The present disclosure provides techniques to migrate a virtual machine from a source hypervisor to a destination hypervisor. Unless specifically stated otherwise, as apparent from the following discussion, it is appreciated that throughout the description, discussions utilizing terms such as "determining," "sending," "reading," "receiving," "transmitting," "providing," "executing," "storing," "updating," "identifying," "running," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
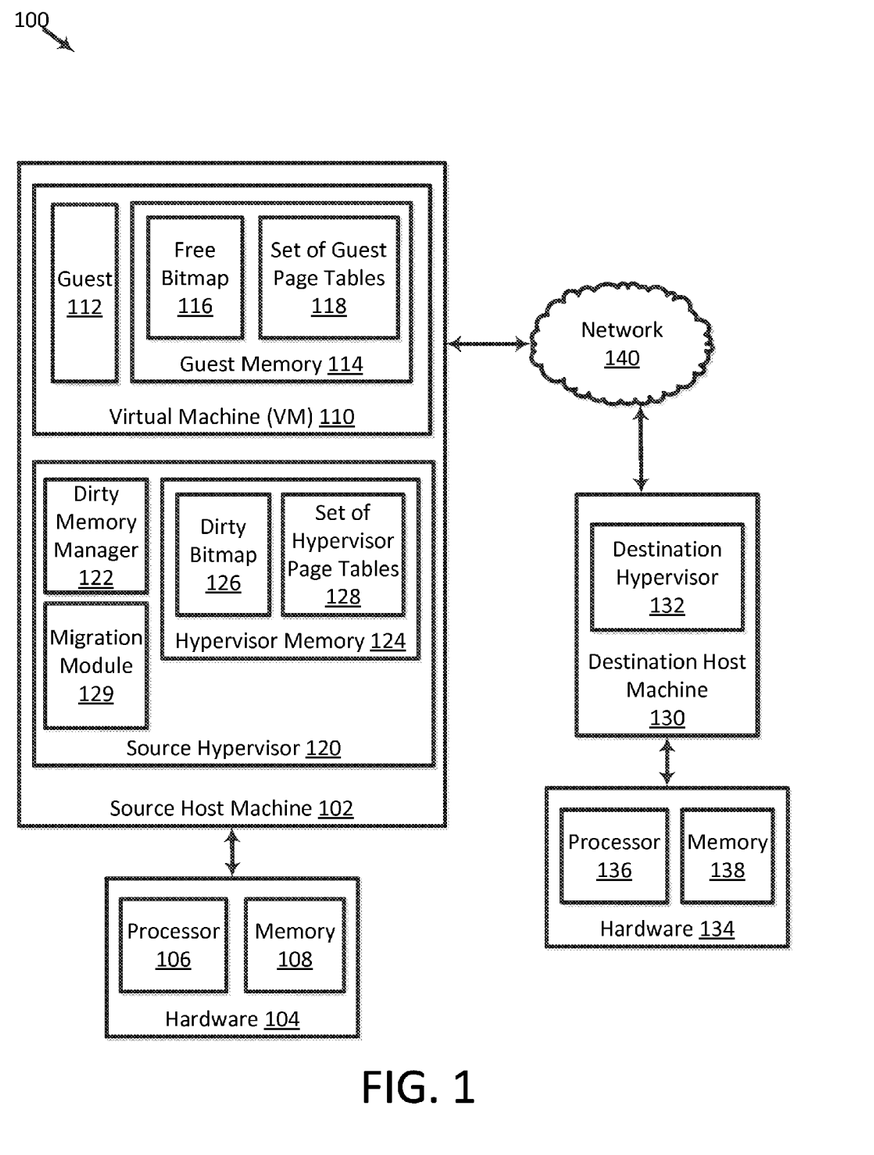
FIG. 1 is a block diagram illustrating a system for migrating a virtual machine from a source hypervisor to a destination hypervisor in accordance with one or more embodiments.

FIG. 1 is a block diagram illustrating a system 100 for migrating a virtual machine from a source hypervisor to a destination hypervisor in accordance with one or more embodiments. System 100 includes a source host machine 102 coupled to hardware 104. Hardware 104 includes a processor 106 and memory 108, and may include other input/output (I/O) devices. A host machine may run one or more virtual machines (VMs) that run applications and services.

Source host machine 102 includes a VM 110 and a source hypervisor 120. Although one VM is illustrated as running on source host machine 102, other embodiments including more than one VM are within the scope of the present disclosure. The hypervisor may allow multiple operating systems, called guests or guest operating systems, to run on the same physical system by offering virtualized hardware to the guest. The host machine may run multiple operating systems, concurrently and in isolation from other programs on a single system. A guest running on the VM may be different from the host OS running on host machine. The host OS or guest may include, for example, MICROSOFT® WINDOWS®, LINUX®, SOLARIS®, and MAC® OS. Trademarks are the property of their respective owners.

A. Page Tables

In a virtualization environment, the hypervisor and each guest running in a host machine has its own set of page tables. Source hypervisor 120 includes dirty memory manager 122, hypervisor memory 124, and migration module 129. Source hypervisor 120 maintains a dirty bitmap 126 and a set of hypervisor page tables 128 in hypervisor memory 124. Set of hypervisor page tables 128 includes one or more mappings from guest-physical memory addresses to host-physical memory addresses, which correspond to physical memory on a native platform. Host-physical memory is hardware memory.

Additionally, each guest maintains its own set of page tables. Guest 112 running on VM 110 may be provided with a guest memory 114. Guest memory 114 may be allocated to guest 112. Guest 112 maintains a set of guest page tables 118 in guest memory 114. Set of guest page tables 118 includes one or more mappings from guest-virtual memory addresses to guest-physical memory addresses, which are guest 112's illusion of physical memory. This illusion is supported by source hypervisor 120, which maps guest 112's guest-physical memory addresses to host-physical memory addresses. The translation from guest-physical memory addresses to host-physical memory address is a real-to-physical mapping that implements the virtualization of memory in a VM system. The combined total size of the guest-physical memory space of all the guests running on source host machine 102 may be bigger than the actual physical memory on the system.

Each entry in a guest page table maps a location in guest 112's virtual memory space to a location in guest 112's physical memory space. Address translation in guest 112 transforms addresses in its guest-virtual address space to locations in guest-physical memory using set of guest page tables 118. To convert a guest-physical memory address to a host-physical memory address, source hypervisor 120 maintains a real map table mapping guest-physical memory pages to host-physical memory pages, and in particular uses set of hypervisor page tables 128 to translate guest-physical memory addresses to host-physical memory addresses.

B. Source Hypervisor Maintains a Dirty Bitmap

Dirty memory manager 122 maintains a dirty bitmap 126 that tracks guest usage of memory pages. Dirty bitmap 126 is located in hypervisor memory 124 and may change at any time. A memory page that is written by a guest is a "dirty page" and may be reset to a "clean page." Dirty bitmap 126 stores a plurality of bits, where each bit has a zero or a one value corresponding to a memory page in guest memory 114. Dirty bitmap 126 includes dirty bits that indicate whether a memory page in guest memory 114 has been updated ("dirty") or has not been updated ("not dirty") by guest 112. A first set of bits in dirty bitmap 126 that has a first value (e.g., 0) indicates that the guest has updated a first set of pages corresponding to the first set of bits. A second set of bits in dirty bitmap 126 that has a second value (e.g., 1) indicates that the guest has not updated a second set of pages corresponding to the second set of bits.

Source hypervisor 120 may access dirty bitmap 126 in a variety of ways. In an example, source hypervisor 120 marks the pages in guest memory 114 as read-only. When guest 112 writes to a memory page in guest memory 114, the memory access is trapped into source hypervisor 120. Based on this trap, source hypervisor 120 may set a bit corresponding to the memory page to a first value in dirty bitmap 126, where the first value indicates that the page is dirty. Accordingly, when hypervisor gets a trap, it can be a read-only trap or a "log some pages that have become dirty" trap. In another example, dirty bits are stored in set of hypervisor page tables 128, and source hypervisor 120 traverses the page table entries one-by-one, fetches the bits corresponding to the dirty bits, and writes the dirty bits in dirty bitmap 126. In such an example, source hypervisor 120 may be slow because dirty bitmap 126 is being accessed one bit at a time. In another example, dirty bits are stored in set of hypervisor page tables 128 and processor 106 informs source hypervisor 120 which bits have been set so that it may be unnecessary for source hypervisor 120 to traverse the page table entries one-by-one.

C. Guest Maintains a Free Bitmap

Guest 112 maintains a free bitmap 116 that tracks the guest's usage of memory pages. Free bitmap 116 is located in guest memory 114 and may change at any time. Although free bitmap 116 is illustrated as being located in guest memory 114, this is not intended to be limiting. It should be understood that free bitmap 116 may reside in any memory region that is accessible by source hypervisor 120. Free bitmap 116 stores a plurality of bits, where each bit has a zero or a one value corresponding to a memory page in guest memory 114. Free bitmap 116 includes a plurality of free values (e.g., "free bits"), where each free value indicates whether the memory page corresponding to the free value is active or inactive.

A memory page is inactive if it is not in use by guest 112 and guest 112 does not care about the data stored in the memory page. The terms "inactive" and "not free" may be used interchangeably in the present disclosure. In contrast, a memory page is active if it is used by guest 112 and guest 112 cares about the data stored in the memory page. An active memory page may be reset as an inactive memory page if guest 112 frees the memory page. The terms "active" and "free" may be used interchangeably. A third set of bits in free bitmap 116 that has a third value indicates that a third set of pages corresponding to the third set of bits is active. A fourth set of bits in free bitmap 116 that has a fourth value indicates that a fourth set of pages corresponding to the fourth set of bits is inactive.

Although the data structure that is used by source hypervisor 120 (e.g., dirty bitmap 126) and guest 112 (e.g., free bitmap 116) to track guest 112's usage of guest memory pages is illustrated as being a bitmap, this is not intended to be limiting and other embodiments having a data structure different from a bitmap are within the scope of the present disclosure. For example, the data structure may be any data structure that stores values that correspond to memory pages in guest memory 114 and that indicate guest 112's usage of the memory pages in guest memory 114. Further, although a cleared bit may be described as indicating an active memory page and a set bit may be described as indicating an inactive memory page, this is not intended to be limiting. Any values (represented by one or more bits) may be used to indicate an active memory page or an inactive memory page.

III. Virtual Machine Migration from Source Hypervisor to Destination Hypervisor

A. Indication to Migrate Virtual Machine

Source host machine 102 may be coupled to a destination host machine 130 over a network 140. Destination host machine 130 includes a destination hypervisor 132 and is coupled to hardware 134. Hardware 134 includes a processor 136 and memory 138. Network 140 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Source hypervisor 120 may receive an indication to migrate VM 110 to destination hypervisor 132. Migration module 129 may assist in migrating VM 110 from the source hypervisor to destination hypervisor 132. Migration module 129 transfers data stored in guest memory 114 to a memory of destination host machine 130. A VM may be migrated for a variety of reasons. In an example, migration module 129 knows that source hypervisor 120 is about to crash and migrates the VM to destination hypervisor 132. In this way, the VM may remain active after source hypervisor 120 crashes. In another example, a user wishing to update or service source hypervisor 120 may notify guest 112 running in VM 110 of the migration. For instance, the user may wish to restart or reboot source host machine 102. In response to the notification, guest 112 may request that migration module 129 initiate migration of VM 110 to destination hypervisor 132.

In another example, source host machine 102 may be resource constrained and VM 110 may be migrated to destination host machine 130 for load balancing purposes. For instance, the hypervisor administrator may be aware that source host machine 102 is resource constrained and desires to reduce the load on source host machine 102. The hypervisor administrator may be, for example, a software module or a human being. In another example, destination host machine 130 may have more computing resources available compared to source host machine 102 running the VM.

B. Hints Provided by Guest

Guest 112 may implement free page hinting and provide source hypervisor 120 with hints about the status of the memory pages in guest memory 114. In some examples, guest 112 may provide source hypervisor 120 with a hint as to whether memory pages in guest memory 114 are being used by guest 112 or not being used by guest 112. In particular, guest 112 provides hints to source hypervisor 120 about whether memory pages in guest memory 114 are active or inactive in guest memory 114. These hints that are provided by guest 112 may be used by source hypervisor 120 to optimize the migration of VM 110 to destination hypervisor 132.

Guest 112 updates a status of its memory pages using free bitmap 116. In some examples, before guest 112 uses a memory page, guest 112 may clear a bit in free bitmap 116 that corresponds to the memory page. Accordingly, if source hypervisor 120 reads this bit in free bitmap 116, source hypervisor 120 knows that the bit's corresponding memory page is active and being used by guest 112. As such, source hypervisor 120 may determine that this memory page should be sent to destination hypervisor 132 if VM 110 is migrated to destination hypervisor 132. Guest 112 may "free" an active memory page and indicate that it is inactive by setting the memory page's corresponding bit (e.g., to 1) in free bitmap 116. An inactive memory page refers to a memory page that guest 112 has not used to store data or that guest 112 has freed and is no longer currently using. If source hypervisor 120 reads this set bit in free bitmap 116, source hypervisor 120 knows that the bit's corresponding memory page is inactive and not currently being used by guest 112. As such, source hypervisor 120 may determine that this memory page should not be sent to destination hypervisor 132 if VM 110 is migrated to destination hypervisor 132.

It is important to note that guest 112 or source hypervisor 120 may update the bits in free bitmap 116. In some embodiments, guest 112 sets and clears the bits in free bitmap 116. Guest 112 may update a free value (e.g., free bit in free bitmap 116) in accordance with the guest's use of the corresponding memory page. In some embodiments, guest 112 performs actions that cause source hypervisor 120 to be aware of guest 112's use of memory pages in guest memory 114, and source hypervisor 120 responds to guest 112's actions by setting or clearing bits in free bitmap 116 accordingly. Source hypervisor 120 may access free bitmap 116 in a variety of ways. In an example, source hypervisor 120 marks the memory pages in guest memory 114 as read-only. When guest 112 writes to a memory page, the memory access is trapped into source hypervisor 120. Based on this trap, source hypervisor 120 may clear the memory page's corresponding bit in free bitmap 116, and change the access permission of the memory page from read-only to read-write.

C. Source Hypervisor Transmits or Skips Memory Pages Based on Free Values in Free Bitmap If a memory page is active, then the memory page is being used by guest 112. In order for VM 110 to be successfully migrated to destination hypervisor 132, source hypervisor 120 should send guest 112's active memory pages to destination hypervisor 132. Source hypervisor 120 may transmit a memory page in guest memory 114 to destination hypervisor 130 in response to determining that the memory page is active. In some examples, source hypervisor 120 may determine that a memory page is active if the memory page's corresponding bit in free bitmap 116 is cleared.

If a memory page is inactive, then the memory page is not being used by guest 112. Accordingly, it may be unnecessary to send inactive memory pages to destination hypervisor 132. It may be desirable for source hypervisor 120 to skip inactive memory pages and not transmit them to destination hypervisor 132. An advantage of not transmitting inactive memory pages to destination hypervisor 132 is the reduction in data transmitted across the network, which may result in VM 110's quicker migration to destination hypervisor 132 compared to transmitting all of guest 112's memory pages in guest memory 114. This may speed up migration because a VM 110 typically uses only a small portion of its allocated memory.

Source hypervisor 120 may determine to not transmit a memory page to the destination hypervisor if the memory page's corresponding free value in free bitmap 116 indicates that the memory page is inactive. Source hypervisor 120 may determine that a memory page is inactive if the memory page's corresponding free bit in free bitmap 116 is set. As such, source hypervisor 120 determines that this memory page can be skipped and that it is unnecessary to send this memory page to destination hypervisor 132 if VM 110 is migrated to destination hypervisor 132.

D. Live Virtual Machine Migration

If one or more virtual processors associated with guest 112 is still running during the migration, source hypervisor 120 may read a free value in free bitmap 116 that indicates the memory page corresponding to the free value is inactive (or free). Accordingly, source hypervisor 120 may determine to not transmit inactive memory pages because they are not being used by guest 112. Before the migration is finished, however, guest 112 may modify one or more of those memory pages that source hypervisor 120 identified as being inactive. For example, guest 112 may clear the appropriate free bit in free bitmap 116 and start using the bit's corresponding memory page without source hypervisor 120 realizing it. This would create an inconsistent state because not all of the guest 112's state would be migrated to destination hypervisor 132. Accordingly, it may be desirable for source hypervisor 120 to track memory page modifications and the dirty values (e.g., dirty bits) in dirty bitmap 126 before determining that the migration of VM 110 has been completed.

Dirty memory manager 122 may set a first set of bits in dirty bitmap 126 to a first value (e.g., 0), which indicates that the guest has updated a first set of pages corresponding to the first set of bits. Dirty memory manager 122 may set a second set of bits in dirty bitmap 126 to a second value (e.g., 1), which indicates that the guest has not updated a second set of pages corresponding to the second set of bits. Dirty memory manager 122 may detect that guest 112 is using a memory page and accordingly set the memory page's corresponding bit to the first value in dirty bitmap 116. In an example, dirty memory manager 122 may determine that guest 112 is using a memory page based on detecting a page fault associated with guest 112 attempting to access the memory page.

Source hypervisor 120 may read a bit in dirty bitmap 116 and determine, based on the bit's value, whether guest 112 has modified the memory page corresponding to the bit. If guest 112 has modified the memory page corresponding to the bit, the memory page is a dirty memory page. If guest 112 has not modified the memory page corresponding to the bit, the memory page is not a dirty memory page.

In some embodiments, source hypervisor 120 detects that a memory page in guest memory 114 is dirty and then clears the memory page's corresponding dirty bit in dirty bitmap 126. Clearing a dirty bit in dirty bitmap 126 may include setting the dirty bit to a value indicating that the dirty bit's corresponding memory page is not dirty. A dirty memory page may indicate that guest 112 has modified the memory page and it should be transmitted from source hypervisor 120 to destination hypervisor 132. Rather than transmit the dirty memory page to destination hypervisor 132 immediately, source hypervisor 120 may clear the memory page's corresponding dirty bit and check the free value in free bitmap 116 that corresponds to the dirty memory page after the dirty bit has been cleared. After the dirty bit corresponding to a memory page is cleared, source hypervisor 120 starts tracking the free bit in free bitmap 116 that corresponds to the memory page.

If guest 112 attempts to use this memory page that source hypervisor 120 detected as being dirty but now has a corresponding dirty bit in dirty bitmap 126 that indicates that the memory page is not dirty, the free bit in free bitmap 116 that corresponds to this memory page will be cleared (e.g., by guest 112 or source hypervisor 120) and then guest 112 will start modifying the memory page. Accordingly, if guest 112 attempts to use this memory page after source hypervisor 120 has detected that the memory page is dirty and has reset the memory page's corresponding dirty bit in dirty bitmap 126 to a value indicating that the memory page is not dirty, source hypervisor 120 may be notified that the free bit in free bitmap 116 has been cleared and the free bit's corresponding memory page is being used by guest 112. In some examples, guest 112 clears a free bit in an atomic operation that includes clearing the free bit in free bitmap 116 and initiating the tracking of the free bit for its corresponding memory page.

E. Allocate Memory at the Destination Hypervisor

Figure 2:
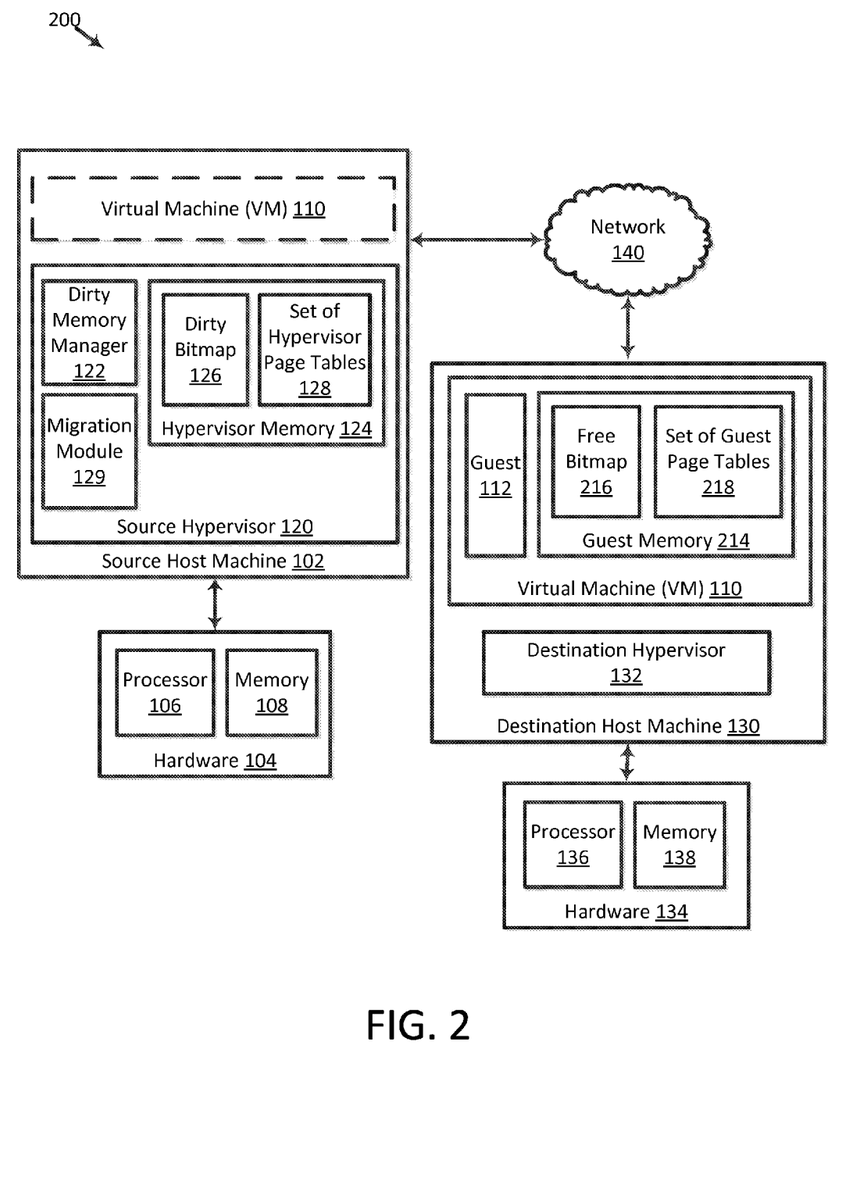
FIG. 2 is a block diagram illustrating a system for migrating a virtual machine from a source hypervisor to a destination hypervisor in accordance with one or more embodiments.

FIG. 2 is a block diagram illustrating a system 200 for migrating a virtual machine from a source hypervisor to a destination hypervisor in accordance with one or more embodiments. In FIG. 2, VM 110 has migrated from source hypervisor 120 to destination hypervisor 132 running on destination host machine 130. VM 110 in source host machine 102 is shown in dashed lines, indicating that VM 110 is no longer running on source hypervisor 130. Rather, destination hypervisor 132 is running VM 110. VM 110 running on destination host machine 130 is allocated a guest memory 214, which may include a free bitmap 216 and a set of guest page tables 218.

During the migration process, migration module 129 may send guest 112's active memory pages to destination hypervisor 132 and determine to not send guest 112's inactive memory pages to destination hypervisor 132. Migration module 129 may determine that the migration of VM 110 to destination hypervisor 132 is complete after VM 110 has stopped running on source host machine 102 and all memory pages in guest memory 114 that are dirty and active have been transmitted to destination hypervisor 132. Source hypervisor 120 identifies memory pages in guest memory 114 that are dirty by checking dirty bitmap 126, and identifies memory pages in guest memory 114 that are free by checking free bitmap 116, which is based on actions performed by guest 112.

In some examples, in response to the determination to not send guest 112's inactive memory pages to destination hypervisor 132, migration module 129 may skip these inactive memory pages, may transmit a zero page to destination hypervisor 132 for each inactive memory page that is skipped, and/or may send a notification to destination hypervisor 132 that particular memory pages (e.g., inactive memory pages) that were allocated to guest 112 at source host machine 102 should be mapped to a zero page. A zero page refers to a memory page that stores all zeros.

In some examples, destination hypervisor 132 detects that it did not receive the content of a set of memory pages in guest memory 114. In such an example, destination hypervisor 132 may map the set of memory pages to a zero memory page. Destination hypervisor 132 may zero out a particular memory page in guest memory 214 (store all zeros in the memory page) to produce the zero memory page, and map any memory page that destination hypervisor 132 identifies as an inactive memory page in guest memory 114 to the zero memory page. Destination hypervisor 132 may map a particular memory page to the zero memory page directly after migration is completed or upon access. It may be desirable to zero out the previous content of a memory page to avoid leaking information between VMs. An advantage of mapping memory pages to a zero memory page may provide for reduced memory usage. Destination hypervisor 132 may set the access permission to those memory pages that are mapped to the zero memory page as read-only. Accordingly, if guest 112 attempts to modify one of these memory pages, the attempted modification will trap into destination hypervisor 132, which may then allocate a different memory page in guest memory 214 for guest 112 to use.

As discussed above and further emphasized here, FIGS. 1 and 2 are merely examples, which should not unduly limit the scope of the claims.

IV. Example Methods

Figure 3:
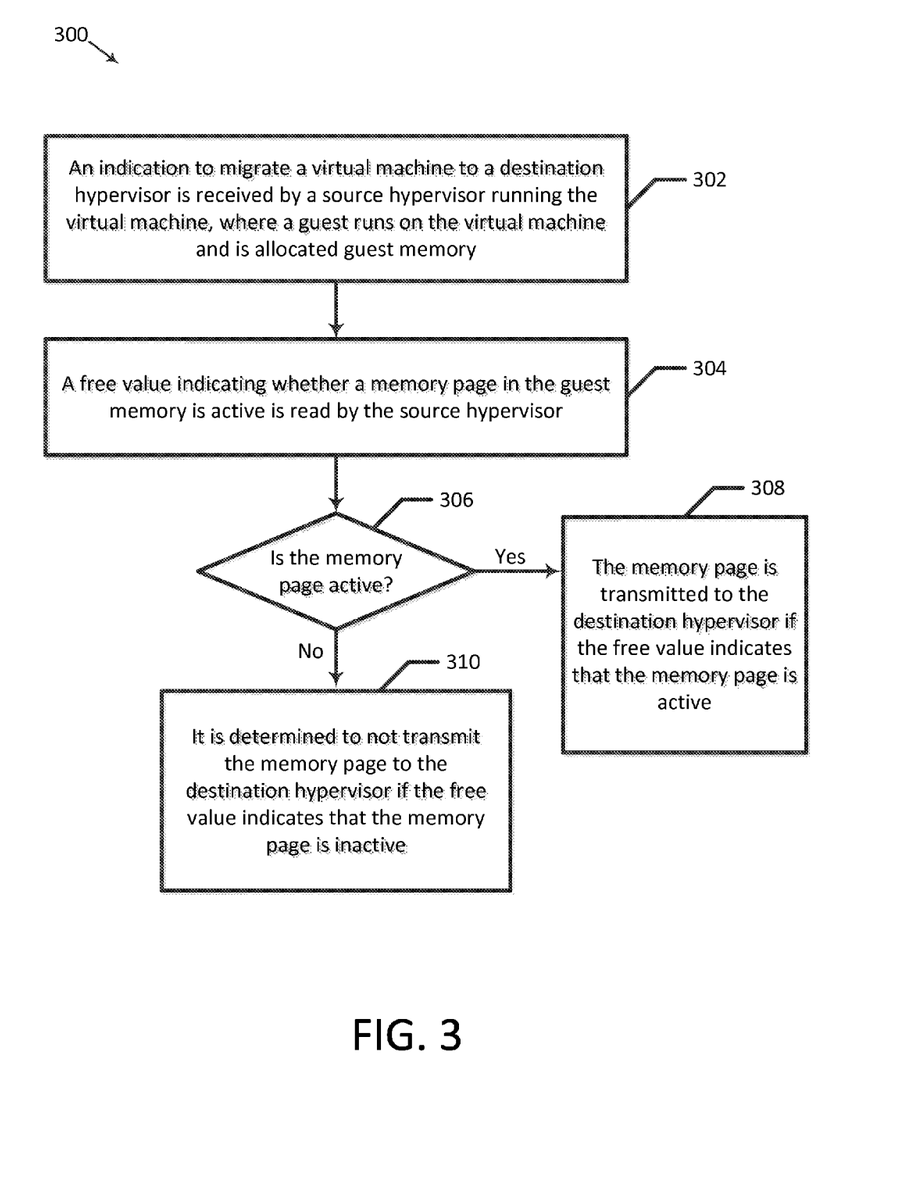
FIG. 3 is a flowchart illustrating a method of migrating a virtual machine from a source hypervisor to a destination hypervisor in accordance with one or more embodiments.

FIG. 3 is a flowchart illustrating a method 300 of migrating a virtual machine from a source hypervisor to a destination hypervisor in accordance with one or more embodiments. Method 300 is not meant to be limiting and may be used in other applications.

Method 300 includes blocks 302-310. In a block 302, an indication to migrate a virtual machine to a destination hypervisor is received by a source hypervisor running the virtual machine, where a guest runs on the virtual machine and is allocated guest memory. In an example, source hypervisor 120 receives an indication to migrate VM 110 to destination hypervisor 132, where guest 112 runs on VM 110 and is allocated guest memory 114. In a block 304, a free value indicating whether a memory page in the guest memory is active is read by the source hypervisor, where the free value is updated by the guest. In an example, source hypervisor 120 reads a free value indicating whether a memory page in guest memory 114 is active, where the free value is updated by guest 112.

In a block 306, it is determined whether the memory page is active. In an example, source hypervisor 120 determines, based on the value of a memory page's corresponding bit in free bitmap 116, whether the memory page is active. In a block 308, the memory page is transmitted to the destination hypervisor if the free value indicates that the memory page is active. In an example, source hypervisor 120 transmits the memory page to destination hypervisor 132 if the free value indicates that the memory page is active. In a block 310, it is determined to not transmit the memory page to the destination hypervisor if the free value indicates that the memory page is inactive. In an example, source hypervisor 120 determines to not transmit the memory page to destination hypervisor 132 if the free value indicates that the memory page is inactive.

It is understood that additional processes may be inserted before, during, or after blocks 302-310 discussed above. It is also understood that one or more of the blocks of method 300 described herein may be omitted, combined, or performed in a different sequence as desired. In some embodiments, one or more actions illustrated in blocks 302-310 may be performed for any number of VM migrations from source hypervisor 120 to another destination hypervisor.

Figure 4:
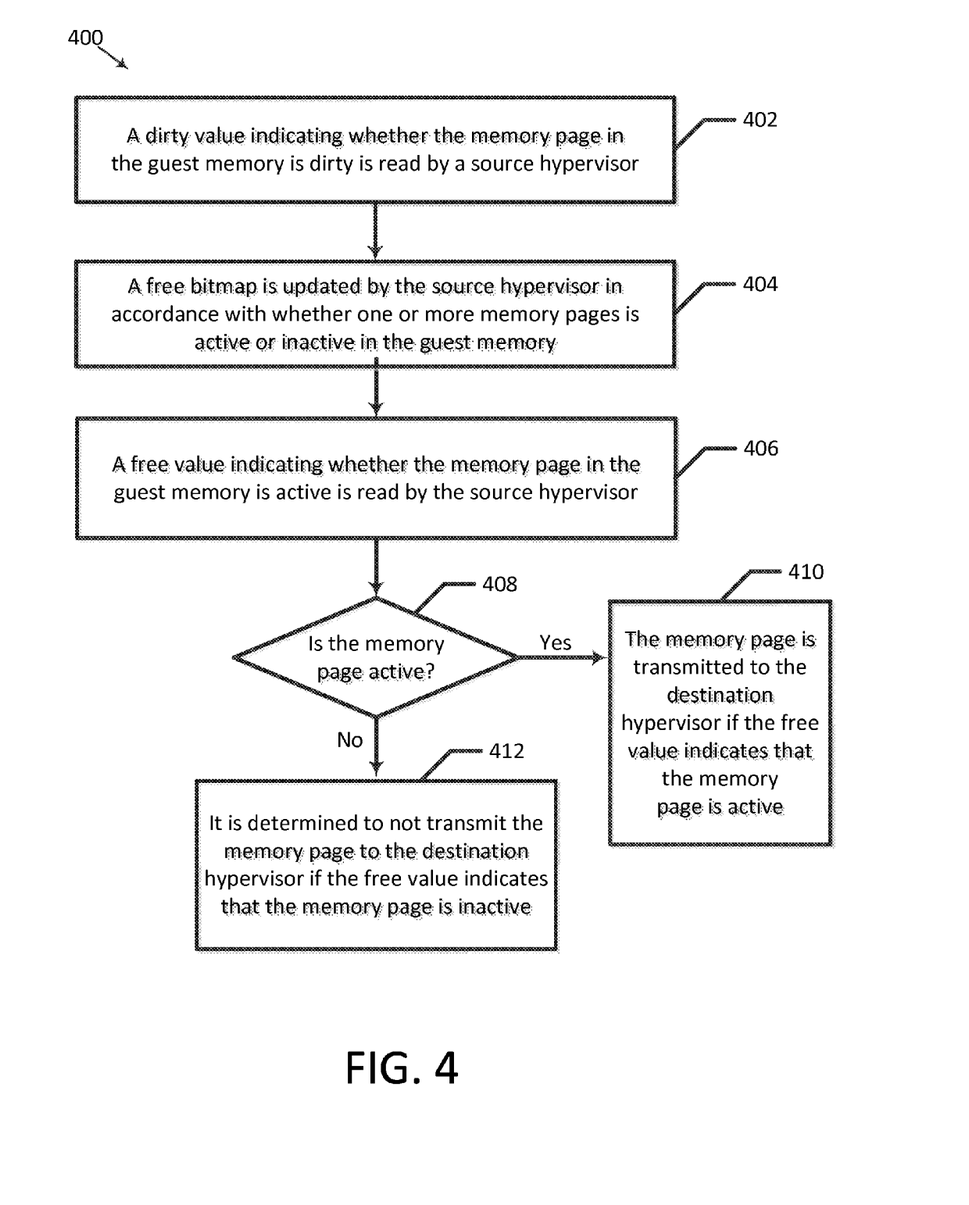
FIG. 4 is a flowchart illustrating a method of migrating a virtual machine from a source hypervisor to a destination hypervisor in accordance with one or more embodiments.

FIG. 4 is another flowchart illustrating a method 400 of migrating a virtual machine from a source hypervisor to a destination hypervisor in accordance with one or more embodiments. Method 400 is not meant to be limiting and may be used in other applications.

Method 400 includes blocks 402-412. In a block 402, a dirty value indicating whether a memory page in a guest memory is dirty is read by a source hypervisor. In an example, source hypervisor 120 reads a dirty value indicating whether a memory page in guest memory 114 is dirty. Source hypervisor 120 may read the dirty value from dirty bitmap 126. In a block 404, a free bitmap is updated by the source hypervisor in accordance with whether one or more memory pages is active or inactive in the guest memory. In an example, source hypervisor 120 updates free bitmap 116 in accordance with whether one or more memory pages is active or inactive in guest memory 114.

In a block 406, a free value indicating whether the memory page in the guest memory is active is read by the source hypervisor. In an example, source hypervisor 120 reads a free value indicating whether the memory page in guest memory 114 is active. Source hypervisor 120 may read the free value from free bitmap 116. In a block 408, it is determined whether the memory page is active. In an example, source hypervisor 120 determines, based on the value of a memory page's corresponding bit in free bitmap 116, whether the memory page is active. In a block 410, the memory page is transmitted to the destination hypervisor if the free value indicates that the memory page is active. In an example, source hypervisor 120 transmits the memory page to destination hypervisor 132 if the free value indicates that the memory page is active. In a block 412, it is determined to not transmit the memory page to the destination hypervisor if the free value indicates that the memory page is inactive. In an example, source hypervisor 120 determines to not transmit the memory page to destination hypervisor 132 if the free value indicates that the memory page is inactive. Source hypervisor 120 may skip the inactive memory pages and/or transmit a zero page or a notification to map the particular inactive memory pages to a zero page to destination hypervisor 132.

It is understood that additional processes may be inserted before, during, or after blocks 402-412 discussed above. It is also understood that one or more of the blocks of method 400 described herein may be omitted, combined, or performed in a different sequence as desired. In some embodiments, one or more actions illustrated in blocks 402-412 may be performed for any number of live VM migrations from source hypervisor 120 to another destination hypervisor.

V. Example Computing System

Figure 5:
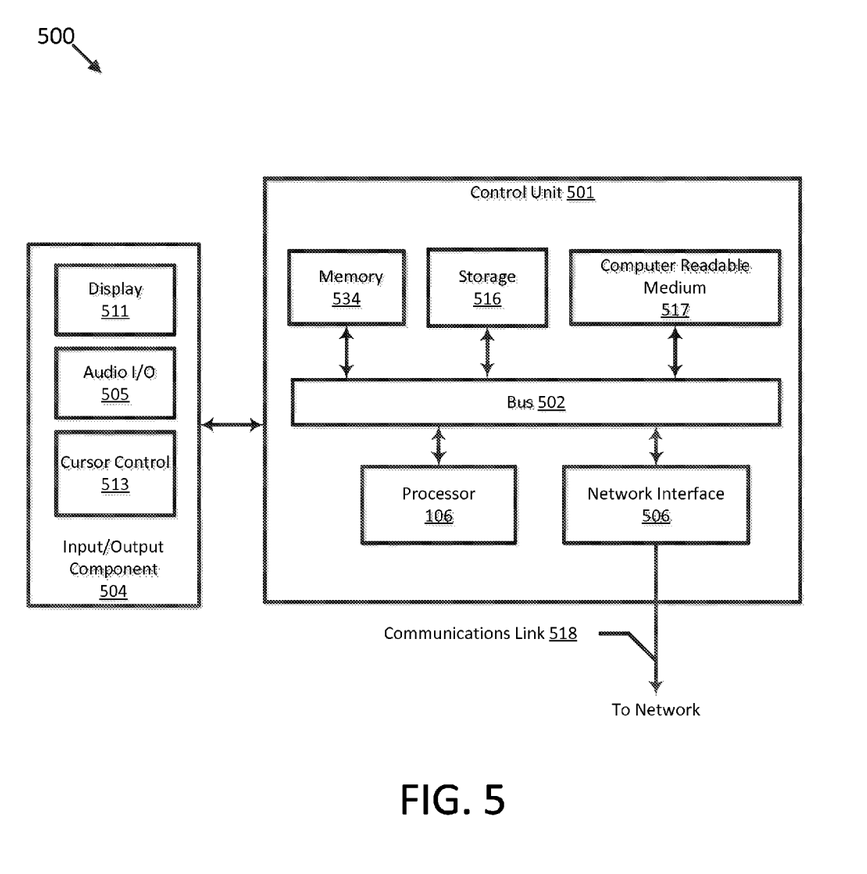
FIG. 5 is a block diagram of an electronic system suitable for implementing one or more embodiments of the present disclosure.

FIG. 5 is a block diagram of a computer system 500 suitable for implementing one or more embodiments of the present disclosure. Each of source hypervisor 120, destination hypervisor 132, and VM 110 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. A processor 106, which may be a micro-controller, digital signal processor (DSP), or other processing component, processes these various signals, such as for display on computer system 500 or transmission to other devices via communications link 518. Components of computer system 500 also include a system memory component 534 (e.g., RAM), a static storage component 516 (e.g., ROM), and/or a computer-readable medium 517. Computer system 500 performs specific operations by processor 106 and other components by executing one or more sequences of instructions contained in system memory component 534.

Components include an input/output (I/O) component 504 that processes a user action, such as selecting keys from a keypad/keyboard, selecting one or more buttons or links, etc., and sends a corresponding signal to bus 502. I/O component 504 may include an output component such as a display 511, and an input control such as a cursor control 513 (such as a keyboard, keypad, mouse, etc.). In some examples, an administrator may provide an input indication to source hypervisor 120 to migrate VM 110 to destination hypervisor 132. An optional audio I/O component 505 may also be included to allow a user to use voice for inputting information by converting audio signals into information signals. Audio I/O component 505 may allow the user to hear audio. A transceiver or network interface 506 transmits and receives signals between computer system 500 and other devices via communications link 518 to a network. For example, source hypervisor 120 may send memory pages to destination hypervisor 132 using network interface 506. In an embodiment, the transmission is wireless, although other transmission mediums and methods may also be suitable.

Logic may be encoded in computer-readable medium 517, which may refer to any medium that participates in providing instructions to processor 106 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 534, and transmission media includes coaxial cables, copper wire, and fiber optics, including wires that include bus 502. In an embodiment, the logic is encoded in non-transitory computer-readable medium. Transmission media may take the form of acoustic or light waves, such as those generated during radio wave, optical, and infrared data communications.

Some common forms of computer-readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 300 or method 400) to practice the present disclosure may be performed by computer system 500. In various other embodiments of the present disclosure, a plurality of computer systems 500 coupled by communications link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer-readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of migrating a virtual machine from a source hypervisor to a destination hypervisor, comprising:
   receiving, by a source hypervisor running a virtual machine, an indication to migrate the virtual machine to a destination hypervisor, wherein a guest runs on the virtual machine and is allocated guest memory;
   reading, by the source hypervisor, a free value indicating whether a memory page in the guest memory is active;
   transmitting the memory page to the destination hypervisor if the free value indicates that the memory page is active, wherein the memory page in the guest memory is active if the memory page is in current use by the guest to store data; and
   determining to not transmit the memory page to the destination hypervisor if the free value indicates that the memory page is inactive, wherein the memory page in the guest memory is inactive if the memory page is not in current use by the guest to store data.

2. The method of claim 1, further comprising:
   reading, by the source hypervisor, a dirty value indicating whether the memory page in the guest memory is dirty; and
   setting the dirty value to a first value indicating that the memory page is not dirty if the dirty value indicates that the memory page is dirty, wherein reading the free value includes reading the free value after setting the dirty value to the first value.

3. The method of claim 1, wherein an active memory page is reset as an inactive memory page if the guest frees the active memory page, and wherein an inactive memory page is set as an active memory page if the guest stores data in the inactive memory page.

4. The method of claim 2, further comprising:
   updating, at the source hypervisor, a dirty bitmap in accordance with whether one or more memory pages has been updated by the guest, wherein the dirty bitmap includes a plurality of bits that includes the dirty value and that corresponds to the one or more memory pages.

5. The method of claim 1, further comprising:
   updating, at the source hypervisor, a free bitmap that includes the free value, wherein the free bitmap is updated in accordance with hints from the guest.

6. The method of claim 1, further comprising:
   updating, at the guest, a free bitmap in accordance with whether one or more memory pages is active or inactive in the guest memory, wherein the free bitmap is in a memory region that is accessible by the source hypervisor, and wherein the free bitmap includes a plurality of bits that includes the free value and that corresponds to the one or more memory pages.

7. The method of claim 1, further comprising:
   receiving, at the source hypervisor, an indication of whether one or more memory pages is active or inactive in the guest memory;
   updating, at the source hypervisor, a free bitmap in accordance with whether the one or more memory pages is active or inactive in the guest memory, wherein the free bitmap includes a plurality of bits that includes the free value and that corresponds to the one or more memory pages.

8. The method of claim 1, further comprising:
   detecting, by the source hypervisor, that a first set of memory pages in the guest memory has been updated;
   providing a first indication that the first set of memory pages is dirty;
   resetting the first indication that the first set of memory pages is dirty to a second indication that the first set of memory pages is not dirty;
   after resetting the first indication, tracking a set of values, each value of the set of values corresponding to a memory page of the first set of memory pages and indicating whether the corresponding memory page is active; and
   transmitting a subset of the first set of memory pages to the destination hypervisor, wherein each tracked value corresponding to the subset indicates that the respective memory page of the subset is active, and wherein the determining to not transmit includes determining to not transmit a given memory page and the given memory page is in the subset of the first set of memory pages.

9. The method of claim 8, wherein no memory pages indicated as inactive are transmitted to the destination hypervisor.

10. The method of claim 8, further comprising:
    stopping, by the source hypervisor running on a source host machine, the virtual machine from running on the source host machine;
    determining that all memory pages in the guest memory that are dirty and active have been transmitted to the destination hypervisor; and
    after determining that all memory pages in the guest memory that are dirty and active have been transmitted to the destination hypervisor, determining that migration of the virtual machine has completed.

11. The method of claim 1, wherein the free value is updated in accordance with hints from the guest.

12. A system for migrating a virtual machine from a source hypervisor to a destination hypervisor, comprising:
    a source hypervisor that runs a virtual machine and receives an indication to migrate the virtual machine to a destination hypervisor, wherein a guest runs on the virtual machine and is allocated guest memory;
    a dirty memory manager that reads a free value indicating whether a memory page in guest memory is active; and
    a migration module that transmits the memory page to the destination hypervisor if the free value indicates that the memory page is active and determines to not transmit the memory page to the destination hypervisor if the free value indicates that the memory page is inactive, wherein the memory page is active if the memory page is in current use by the guest to store data, and the memory page is inactive if the memory page is not in current use by the guest to store data.

13. The system of claim 12, wherein the source hypervisor reads a dirty value indicating whether the memory page in the guest memory is dirty, and wherein the source hypervisor sets the dirty value to a first value indicating that the memory page is not dirty if the dirty value indicates that the memory page is dirty.

14. The system of claim 13, wherein the source hypervisor reads the free value after setting the dirty value to the first value.

15. The system of claim 13, wherein the source hypervisor updates a dirty bitmap in accordance with whether one or more memory pages has been updated by the guest, and wherein the dirty bitmap includes a plurality of bits that includes the dirty value and that corresponds to the one or more memory pages.

16. The system of claim 12, wherein the source hypervisor updates a free bitmap that includes the free value, and wherein the free bitmap is updated in accordance with hints from the guest.

17. The system of claim 12, wherein the guest updates a free bitmap in accordance with whether one or more memory pages is active or inactive in the guest memory, wherein the free bitmap is in a memory region that is accessible by the source hypervisor, and wherein the free bitmap includes a plurality of bits that includes the free value and that corresponds to the one or more memory pages.

18. The system of claim 17, wherein the guest sets the free value to a first value if the memory page is active, and sets the free value to a second value if the memory page is inactive.

19. The system of claim 12, wherein the source hypervisor receives an indication of whether one or more memory pages is active or inactive in the guest memory, and wherein the source hypervisor updates a free bitmap in accordance with whether the one or more memory pages is active or inactive in the guest memory, and wherein the free bitmap includes a plurality of bits that includes the free value and that corresponds to the one or more memory pages.

20. A non-transitory machine-readable medium comprising a plurality of machine-readable instructions that when executed by one or more processors are adapted to cause the one or more processors to perform a method comprising:
  receiving, by a source hypervisor running a virtual machine, an indication to migrate the virtual machine to a destination hypervisor, wherein a guest runs on the virtual machine and is allocated guest memory;
  reading, by the source hypervisor, a free value indicating whether a memory page in the guest memory is active;
  transmitting the memory page to the destination hypervisor if the free value indicates that the memory page is active, wherein the memory page is active if the memory page is in current use by the guest to store data; and
  determining to not transmit the memory page to the destination hypervisor if the free value indicates that the memory page is inactive, wherein the memory page is inactive if the memory page is not in current use by the guest to store data.

* * * * *